United States Patent
Wright

(10) Patent No.: US 7,284,542 B2
(45) Date of Patent: Oct. 23, 2007

(54) TAPERED TOROIDAL FLOW CONTROL VALVE AND FUEL METERING DEVICE

(76) Inventor: Gordon Fraser Wright, 13545-113th Avenue, Surrey, BC (CA) V3R 6S9

( * ) Notice: Subject to any disclaimer, the term of this patent is extended or adjusted under 35 U.S.C. 154(b) by 25 days.

(21) Appl. No.: 11/521,704

(22) Filed: Sep. 15, 2006

(65) Prior Publication Data

US 2007/0068496 A1   Mar. 29, 2007

Related U.S. Application Data

(60) Provisional application No. 60/720,313, filed on Sep. 23, 2005.

(51) Int. Cl.
  *F02B 43/00* (2006.01)
(52) U.S. Cl. ..................... 123/527
(58) Field of Classification Search ............. 123/527, 123/27 GE, 525
  See application file for complete search history.

(56) References Cited

U.S. PATENT DOCUMENTS

| | | | |
|---|---|---|---|
| 6,131,552 A * | 10/2000 | Paielli et al. | 123/527 |
| 6,178,952 B1 * | 1/2001 | Lammerts et al. | 123/527 |
| 6,748,932 B1 * | 6/2004 | Sorter et al. | 123/527 |
| 6,955,160 B1 * | 10/2005 | Konopacki et al. | 123/527 |

* cited by examiner

*Primary Examiner*—Hai Huynh

(57) ABSTRACT

A fuel metering device utilizing a tapered toroid shaped flow control valve placed between a pressure chamber and a discharge space, with a seal, fixedly mounted to the valve, fluidically isolating the pressure chamber from the discharge space when the valve is in its closed position, and a rotary actuator capable to move the toroidal valve about a fixed fulcrum to deliver a precisely metered amount of a preferably gaseous fuel to an internal combustion engine. The device further comprises a biasing spring, to close the valve when the rotary actuator is de-energized, and a rotary position sensor, which, in co-operation with the rotary actuator enable accurate angular positioning of the valve.

5 Claims, 6 Drawing Sheets

TAPERED TOROIDAL FLOW CONTROL VALVE AND FUEL METERING DEVICE

This application claims benefit under 37 CFR 119e to provisional application 60/720313—Tapered Toroidal Flow Control Valve And Fuel Metering Device—filed on Sep. 23, 2005 by Gordon F Wright.

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO MICROFICHE APPENDIX

Not Applicable.

BACKGROUND OF THE INVENTION

This invention relates to fluid flow control systems and more particularly to gaseous fuels systems for internal combustion engines.

With ever more stringent emissions regulations, the use of alternative gaseous fuels for operating internal combustion engines has become increasingly attractive. The more commonly used gaseous fuels are compressed natural gas (CNG) and liquefied petroleum gas (LPG). These gases can burn cleaner than gasoline and the cost per unit of energy is lower.

Currently, the gaseous fuels industry still relies heavily on carburetor based mixture formation devices, of the fixed or variable venturi type. There are several major shortcomings associated with the aforementioned technologies, the most serious of which are the airflow restriction created by the venturi and the closed loop control problems. For a given air flow through a venturi, the venturi draws a predetermined amount of fuel, the fuel flow rate being a function of the depression at the venturi throat. In order to alter the fuel flow rate, additional devices are required that need to work in co-operation with the venturi. Due to the complexity of the flow phenomena through the venturi, carburetors are difficult to integrate into control systems.

Since there is no need to atomize a gaseous fuel, a gas metering device of adequate control range, speed and resolution would in principle suffice. Such metering devices have been developed, utilizing either a rotary butterfly valve, or a linear conical valve, actuated by a proportional solenoid.

The drawbacks of the butterfly valve solution are the impossibility to seal fuel flow completely, a usable angular stroke lesser than 90 degrees and the difficulty in profiling the valve to match fuel flow requirements.

A linear conical valve device can be designed to seal when closed and the cone profile can be shaped to match fuel flow requirements. There are, however, at least two main problems with the linear type actuator required to drive such a valve: in order to increase control resolution, it is desirable to extend the cone profile as much as possible. This entails a long actuator stroke, which leads to large, heavy and expensive actuators. The other problem is the difficult and expensive means to measure the linear position of the conical valve.

BRIEF SUMMARY OF THE INVENTION

The device of the invention overcomes the aforementioned disadvantages of the prior art by utilizing an electrically actuated and electronically controllable tapered toroidal flow control valve. This novel type of flow control valve combines the advantages of the butterfly and linear conical valves, without inheriting any of their shortcomings.

The fuel metering device of the invention utilizes a tapered toroidal valve to control the flow of a fluid through a passage between a pressure chamber and a discharge space. A lever arm pivotably connects the valve to a fulcrum situated at the circular axis of the toroid.

A rotary actuator moves the valve along a circular trajectory, about the fulcrum. A return spring urges the valve to a closed position whereby a fluid tight seal is provided between the pressure chamber and the discharge space.

OBJECTS AND ADVANTAGES

Accordingly, several objects and advantages of my invention are:

Advantages of Rotary Versus Linear Travel:
 Ease of position measurement and use of smaller and less expensive actuators. It is possible to use reliable and less expensive guide bearings. The proportional solenoid required by an equivalent stroke linear motion valve would be larger, heavier and more expensive than the rotary actuator.

Advantages of Tapered Toroidal Valve Over the Butterfly Valve:
 The device of the invention can seal the gas passage.
 The tapered toroidal valve is geometrically similar to a conical valve, the profile of which can be advantageously shaped to meet the engine fuelling requirements, which cannot be done with a butterfly type valve.
 It is possible to obtain a useful rotational travel greater than 90 degrees, which is impossible with a butterfly valve.
 Due to its longer angular stroke, the metering device of the invention covers a broader engine displacement range and can be used with a wider energy content range of fuels.
 All of the above features can significantly reduce inventory to the distributors and end users.

Advantages of the Fuel Metering Device of the Invention Over Fixed or Variable Venturi Carburetors:
 The metering device according to the invention is less restrictive on engine airflow, thereby increasing engine output performance.
 The metering device of the invention is easier to control electronically than any carburetor, because fuel flow control is not inherently coupled with engine airflow.
 The device of the invention has a potentially wider flow control range than most contemporary carburetors.
 The majority of modern engines use electronic throttle control. The fuel metering device according to the invention provides more accurate transient fuelling to such engines, as the flow control valve is actuated independently of the engine throttle, making it possible to anticipate throttle movement during engine acceleration.

LIST OF REFERENCE LETTERS AND NUMERALS a Angular Position
A Flow Area, Conical Valve
B Flow Area, Tapered Toroidal Valve
D Distance, Conical Valve to Seat
F Fluid
G Gaseous Fuel
10 Conical Valve
11 Seat
12 Seal
13 Tapered Toroidal Valve
14 Pivot Axis
31 Fuel Inlet
32 Fuel Chamber
33 Valve Seat
34 Air Intake Duct
35 Throttle Plate
36 Intake Manifold
37 Flow Control Valve
38 Fulcrum
39 Pivot Arm
40 Seal Means
41 Return Spring
42 Rotary Actuator
51 Helical Groove
61 Inverted Cone
71 Rotary Position Sensor
72 Upstream Pressure Transducer
73 Downstream Pressure Transducer
74 Temperature Sensor

DETAILED DESCRIPTION OF THE INVENTION

Figure 3:
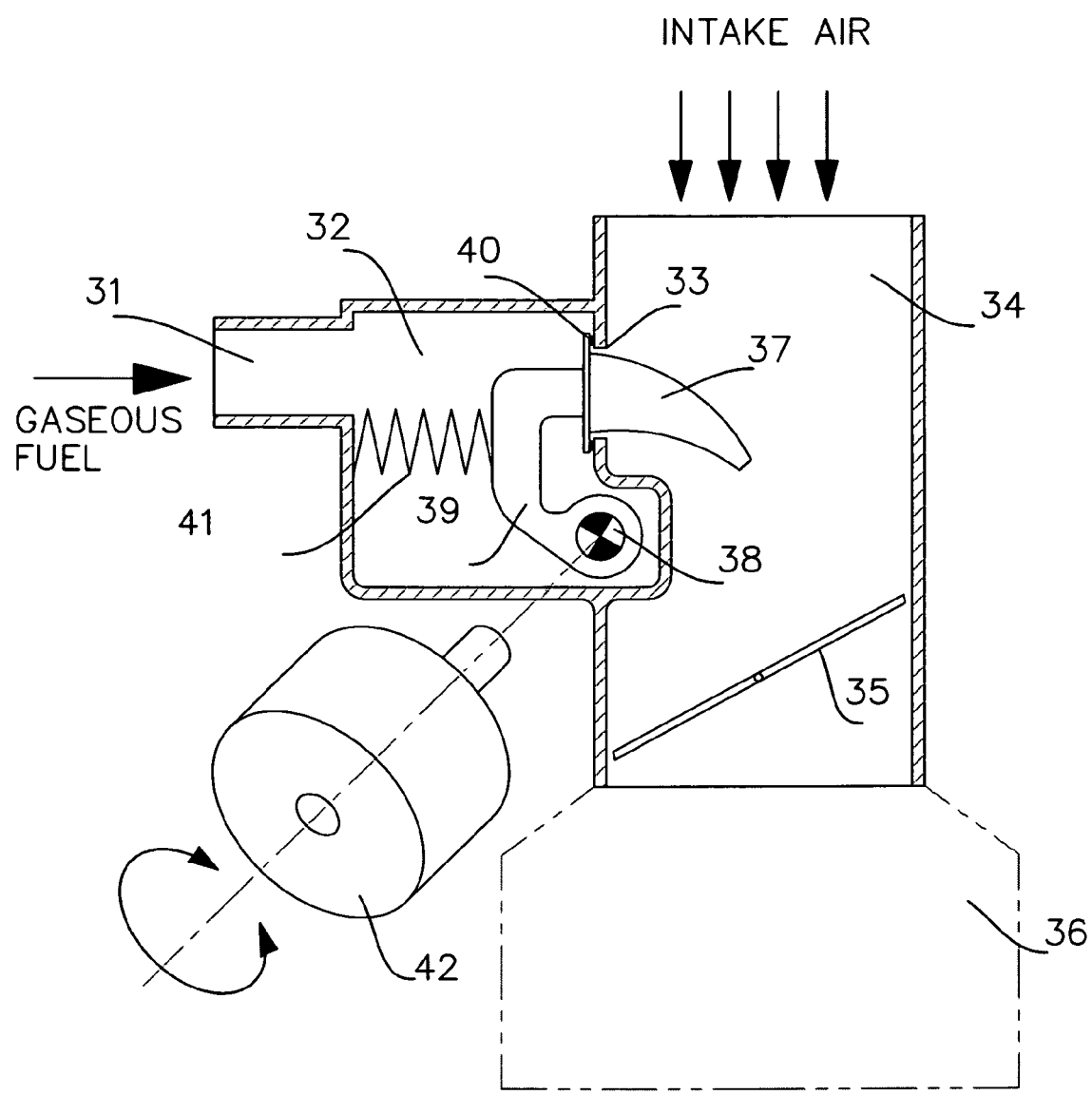
FIG. 3 shows a preferred embodiment of the fuel metering device, according to the invention, shown in a neutral, non-activated position.
Figure 4:
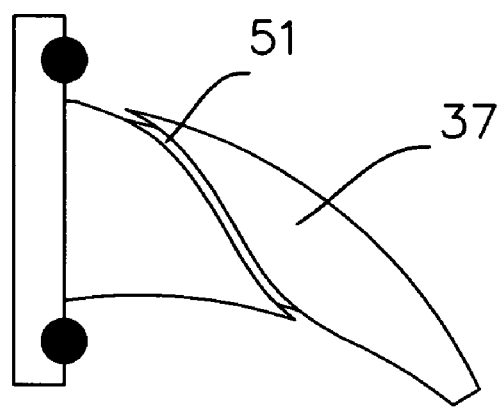
FIG. 4 presents an additional feature of the flow control valve of the invention.
Figure 5:
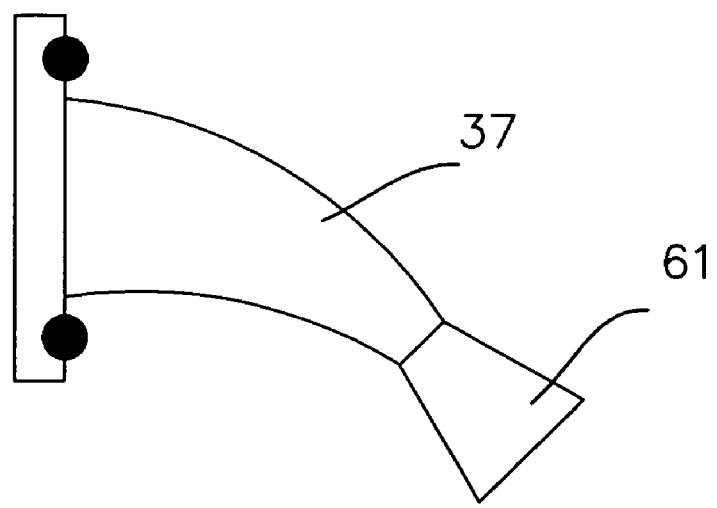
FIG. 5 depicts yet another additional feature of the flow control valve of the invention.
Figure 6:
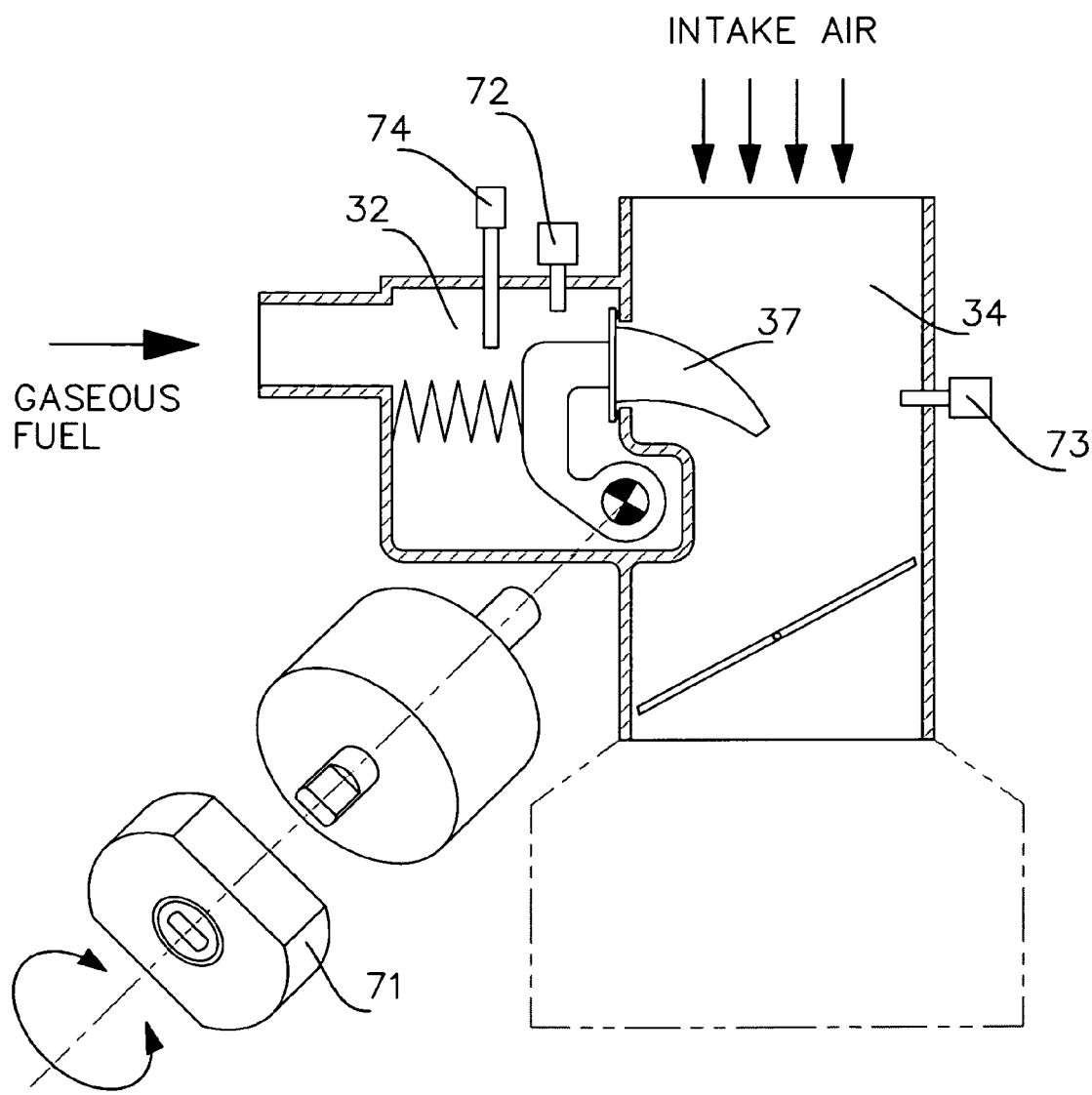
FIG. 6 is a schematic representation of another embodiment of the metering device of the invention.

FIGS. 1 and 2 refer to the fluid flow control valve geometry, compared to a linear travel conical valve. FIG. 3 relates to the fuel metering device of the invention. FIGS. 4 and 5 capture additional features of the flow control valve. FIG. 6 shows another embodiment of the metering device.

Figure 1A:
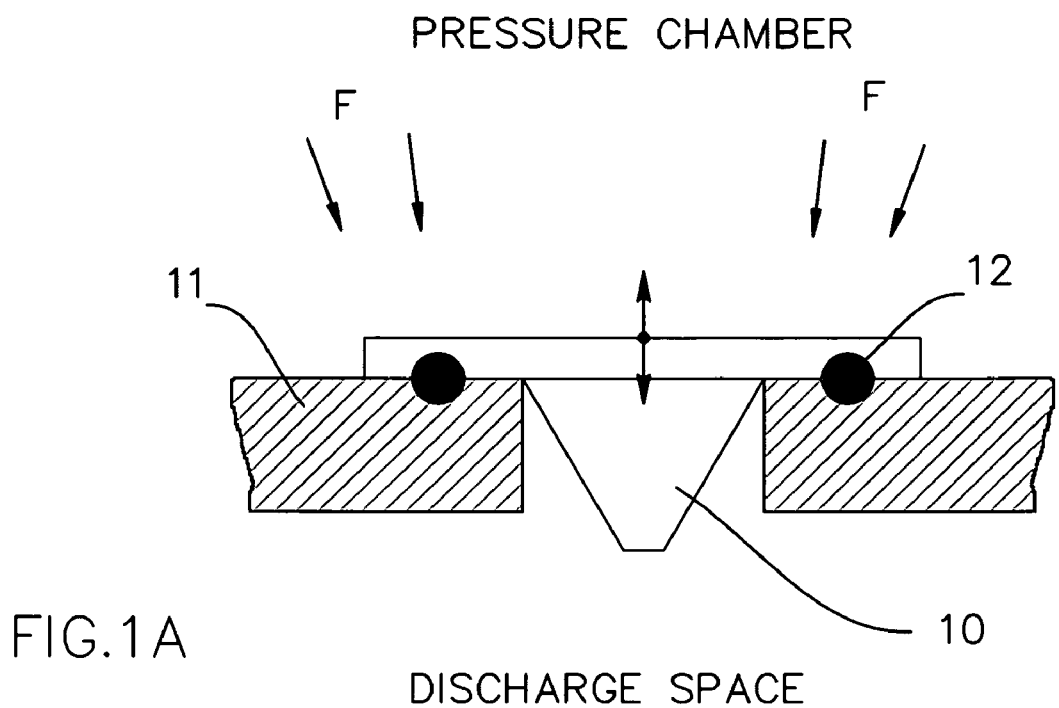
FIG. 1A is a schematic representation of a linear travel conical flow control valve, in its closed position.
Figure 1B:
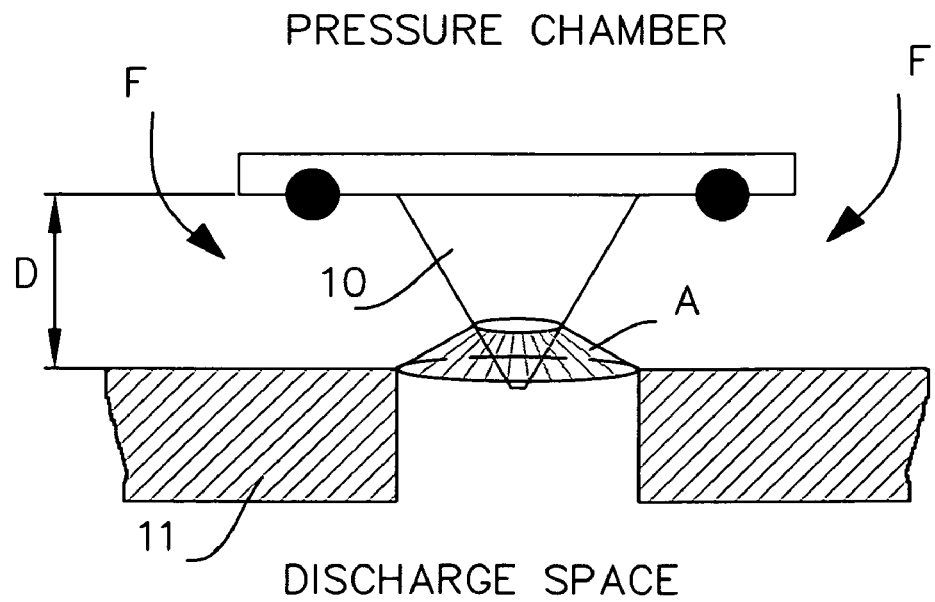
FIG. 1B is a schematic representation of a linear travel conical flow control valve, in operation.

FIG. 1A and FIG. 1B review the operating principle of a linear travel conical valve. FIG. 1A shows a conical valve, 10, in its closed position against a seat 11. In the closed position, a seal 12 provides a fluid tight seal between a pressure chamber and a discharge space. The pressure chamber contains a fluid F, under a pressure substantially higher than the pressure in the discharge space.

Referring now to FIG. 1B, conical valve 10 is shown in a lifted position, at a distance D from the seat, thereby opening a flow area A for fluid F to flow through. Conical valve 10 now meters the flow of the fluid, from the pressure chamber into the discharge space. It is apparent that flow area A, controlled by the conical valve, is the surface area of a frustum of a cone. Flow area A is a function of seat diameter, valve lift and profile.

Figure 2A:
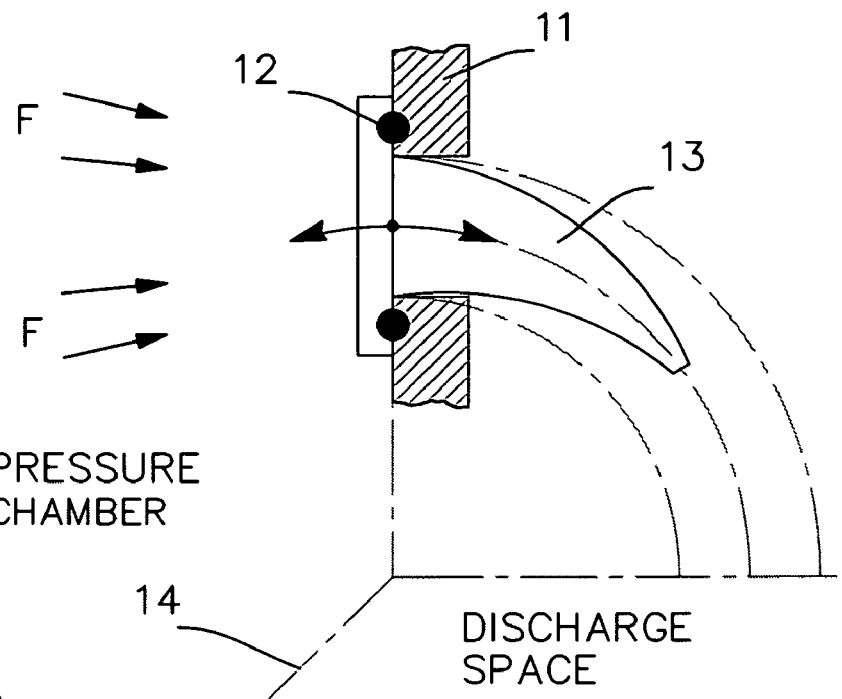
FIG. 2A is a schematic representation of the flow control valve of the invention, in its closed position.
Figure 2B:
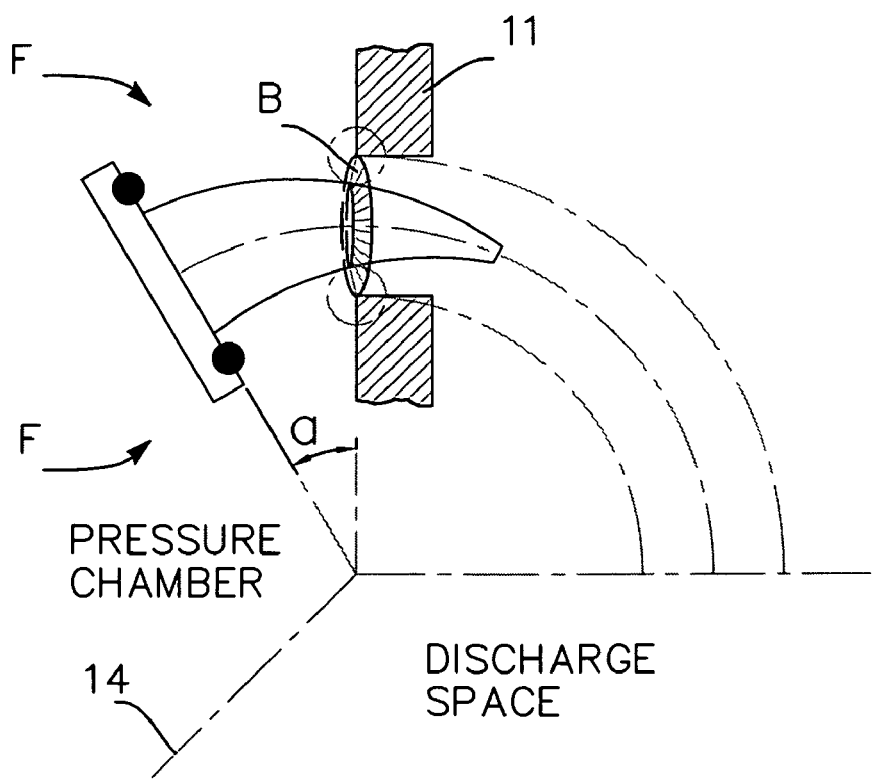
FIG. 2B is a schematic representation of the flow control valve of the invention, in operation.

FIG. 2A and FIG. 2B illustrate the geometrical concept of the novel fluid flow control valve, according to the invention. As depicted by FIG. 2A, a tapered toroidal valve 13, is utilized to control the flow of fluid F, between a pressure chamber and a discharge space. A tapered toroid can be viewed as a cone having a circle, instead of a line, for its axis. The linear motion of the cone, along a straight axis, becomes a rotary motion of the tapered toroid, along its circular axis and about a fixed pivot axis 14. Tapered toroidal valve 13 is shown in a closed position against seat 11, with seal 12 providing a fluid tight seal between the pressure chamber and the discharge space.

FIG. 2B shows the tapered toroidal valve of the invention in an open position, at an angular position a from seat 11, thereby opening a flow area B for fluid F to flow through. It can be shown that the flow area is a function of the valve angular position and valve profile, similar to the cone valve case. The toroid axis is a circle, the center of which lies on pivot axis 14. Preferably, the pivot axis is in the same plane with the seat face closest to the pressure chamber.

FIG. 3 illustrates a preferred embodiment of the fuel metering device of the invention, in its neutral, non-activated state.

The device has a fuel inlet, 31, fluidically connectable to an external source of a preferably gaseous fuel, G, at one end and to a fuel chamber, 32, at the other end. A preferably ring shaped valve seat 33 provides a fuel passage, fluidically connecting the fuel chamber to an engine air intake duct 34, upstream of an engine throttle plate 35. The space downstream of the throttle plate communicates with an internal combustion engine intake manifold 36.

Inside fuel chamber 32, a flow control valve 37, of the previously described tapered toroidal shape, is pivotably mounted on a fulcrum 38, by means of a pivot arm 39. A seal means 40 is fixedly mounted to flow control valve 37. A return spring 41 resiliently coerces flow control valve 37 to a closed position against valve seat 33, providing a fluid tight seal between fuel chamber 32 and engine air intake duct 34. The device also comprises a rotary actuator 42, the rotating shaft of which is attached to pivot arm 39, in a torsionally rigid manner.

As revealed by FIG. 4, flow control valve 37 may have at least one helical groove 51, cut thereunto. Helical groove 51 induces a swirl motion to the flowing fuel, thereby enhancing mixing of the fuel with the intake air.

As illustrated in FIG. 5, the tapered toroidal flow control valve may further comprise an inverted cone feature 61. Inverted cone 61 generates additional turbulence in the flowing fluid, thereby further enhancing mixing of the fuel with the intake air. The inverted cone feature can be used independently of, or in combination with, helical groove 51.

As depicted by FIG. 6, other embodiments of the device of the invention may further comprise a rotary position sensor 71, installed such as to measure the angular position of flow control valve 37, an upstream pressure transducer 72, sensing fuel pressure inside fuel chamber 32, a downstream pressure transducer 73, sensing pressure inside engine air intake duct 34, and a temperature sensor 74, sensitive to fuel temperature inside fuel chamber 32.

Operation

Figure 7:
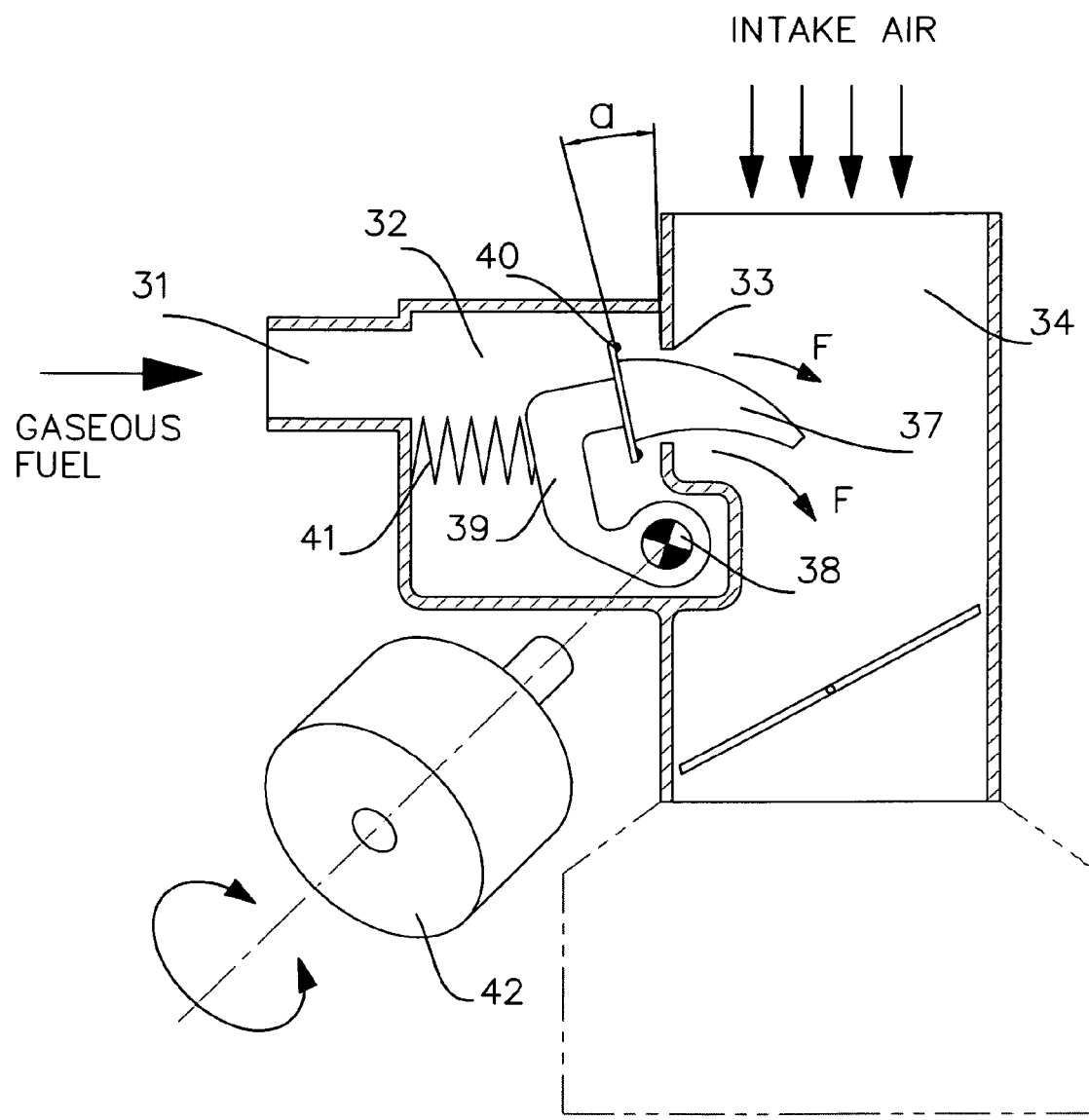
FIG. 7 illustrates the operation of a preferred embodiment of the fuel metering device of the invention.

FIG. 7 illustrates the operation of the metering device of the invention.

Fuel inlet 31 is connected to an external reservoir containing preferably gaseous fuel G under a pressure substantially higher than air pressure inside engine air intake duct 34, thereby filling fuel chamber 32 with said gaseous fuel. When an electrical signal is fed to rotary actuator 42, the actuator causes pivot arm 39 to rotate about fulcrum 38, which in turn moves flow control valve 37 on a circular trajectory, away from valve seat 33, thereby opening a passage for gaseous fuel G to flow through.

Assuming fuel density is known, and assuming that the pressure differential across valve seat 33 is substantially constant and is also known, the fuel flow rate will only depend on the flow area controlled by flow control valve 37. For a known flow control valve profile, the flow area is only a function of valve angular position, a.

The valve angular position can be precisely controlled by modifying the intensity of the electrical signal applied to rotary actuator 42, thereby providing accurate metering of gaseous fuel G under any operating conditions.

When zero fuel flow is desired, the electrical signal to rotary actuator 42 is interrupted, allowing return spring 41 to close flow control valve 37 against valve seat 33. When flow control valve 37 is closed, seal means 40, which is fixedly attached to the flow control valve, provides a fluid tight seal between fuel chamber 32 and the engine air intake duct 34. Such is the case when the engine is not running, or during deceleration and overrun. Additionally, the capability to seal the fuel flow constitutes a built-in safety feature of the fuel metering device of the invention.

CONCLUSION, RAMIFICATIONS AND SCOPE

Thus the reader will see that the fuel system of the invention provides a simple yet effective solution for feeding a precisely metered amount of fuel gas to an internal combustion engine.

Accordingly, the scope of the invention should be determined not by the embodiment illustrated, but by the appended claims and their legal equivalents.

I claim:

1. A gas metering device comprising:
    (a) a pressure chamber,
    (b) a discharge passage, fluidically connecting said pressure chamber to a discharge space, outside said pressure chamber,
    (c) a gas inlet, having one end fluidically connected to said pressure chamber and a second end, fluidically connected to a source of gas at a pressure substantially higher than the pressure in said discharge space,
    (d) a tapered toroidal metering valve, controlling the flow of the gas through said discharge passage,
        said tapered toroidal metering valve being shaped as a segment of a torus of predetermined arc length, and
        said segment of a torus having a first and a second end face, situated at said predetermined arc length apart, and
        said first end face having an area distinguishably larger than the area of said second end face,
    (e) actuator means, for moving the metering valve in a circular motion about the torus axis.

2. A tapered toroidal metering valve according to claim 1 further comprising at least one geometrical feature, including a helical groove, whereby
    (a) said at least one geometrical feature interferes with the gas flow, inducing a controlled motion, such as swirl, to said gas.

3. A gas metering device according to claim 1, further comprising:
    (a) means, including springs, for returning said tapered toroidal metering valve to a closed position, against said discharge passage, when said actuator means is inactive,
    (b) means, including rubber seals, to provide a fluid tight seal at said discharge passage, when the metering valve is in its closed position.

4. A gas metering device according to claim 1, further comprising:
    (a) Means, including a rotary position sensor, for measuring the angular position of the metering valve.

5. A control system comprising an internal combustion engine, and at least one gas metering device according to claim 1, whereby:
    (a) said internal combustion engine operates, in part or entirely, on a gaseous fuel, and
    (b) each of said at least one gas metering devices supplies a predetermined amount of said gaseous fuel to said internal combustion engine.

* * * * *